(12) United States Patent
Suzuki et al.

(10) Patent No.: US 8,892,281 B2
(45) Date of Patent: Nov. 18, 2014

(54) TORQUE CONTROL SYSTEM FOR SUPPRESSING VIBRATION IN AN ELECTRIC VEHICLE

(75) Inventors: Keisuke Suzuki, Kawaski (JP); Masahiro Nakamizo, Kanagawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 185 days.

(21) Appl. No.: 13/425,484

(22) Filed: Mar. 21, 2012

(65) Prior Publication Data

US 2012/0245773 A1    Sep. 27, 2012

(30) Foreign Application Priority Data

Mar. 22, 2011    (JP) ................................. 2011-062378

(51) Int. Cl.
*B60L 9/00*    (2006.01)
*B60L 15/20*   (2006.01)
*B60W 10/08*   (2006.01)
*B60W 30/20*   (2006.01)

(52) U.S. Cl.
CPC ................ *B60L 15/20* (2013.01); *B60W 10/08* (2013.01); *B60W 30/20* (2013.01)
USPC .............................. 701/22; 318/430; 318/432

(58) Field of Classification Search
USPC ............... 701/22; 180/65.265, 65.28, 65.285, 180/65.21; 318/430, 432; 477/115
See application file for complete search history.

(56) References Cited

U.S. PATENT DOCUMENTS

| 2008/0045382 | A1* | 2/2008 | Kawasaki et al. ............. 477/115 |
| 2009/0042688 | A1* | 2/2009 | Itou et al. ........................ 701/22 |
| 2009/0271057 | A1* | 10/2009 | Stone .............................. 701/22 |

FOREIGN PATENT DOCUMENTS

JP    2001-28809    1/2001

* cited by examiner

*Primary Examiner* — Thomas Tarcza
*Assistant Examiner* — Kevin Myhre
(74) *Attorney, Agent, or Firm* — Antonelli, Terry, Stout & Kraus, LLP.

(57) ABSTRACT

A control system for an electric vehicle has a vehicle speed calculation section that calculates a speed of the electric vehicle and a control unit that controls an inverter of an electric motor to provide road wheels with a predetermined reference torque in accordance with a manipulated value of an accelerator pedal, wherein the unit has a reference torque correction section that changes the reference torque from an original value and then returns the changed reference torque to the original value when a calculated speed of the electric vehicle is in a given speed range.

9 Claims, 6 Drawing Sheets

TORQUE CONTROL SYSTEM FOR SUPPRESSING VIBRATION IN AN ELECTRIC VEHICLE

BACKGROUND OF THE INVENTION

1. Field of the Invention

The present invention relates in general to control systems for an electric vehicle, and more particularly to the control systems of a type that suppresses undesired vibration of an electric vehicle caused by a disturbance torque of an electric motor that drives the vehicle.

2. Description of the Related Art

One of the control systems of the above-mentioned type is shown in Japanese Laid-open Patent Application (tokkai) 2001-28809, which discloses a technology for restraining the undesired vibration of the electric vehicle by estimating a disturbance torque of an electric motor that drives the electric motor and feeding the estimated disturbance torque back to a torque instruction that is applied to the electric motor.

SUMMARY OF THE INVENTION

However, in the above-mentioned known technology, in order to eliminate or minimize the disturbance torque, a very high torque control performance is needed. That is, if the torque control performance is low, satisfied vibration restraining effect is not obtained.

It is therefore an object of the present invention to provide a control system for an electric vehicle, which exhibits a high vibration restraining effect to an electric vehicle.

In the control system of the present invention, when a running speed of the electric vehicle comes into a predetermined speed range, decrease/increase of a reference torque is carried out and then the reference torque thus decreased/increased is returned to its original level. With such technology, undesired vibration of the electric vehicle is suppressed or at least reduced to a satisfied small level.

In accordance with a first aspect of the present invention, there is provided a control system for an electric vehicle. The electric vehicle includes an accelerator pedal, a brake pedal, an electric motor that provides road wheels with a torque through axle shafts and an inverter that feeds the electric motor with an electric current. The control system comprises a vehicle speed calculation section that calculates a speed of the electric vehicle; and a control unit that controls the inverter to provide the road wheels with a predetermined reference torque in accordance with a manipulated value of the accelerator pedal, the control unit including a reference torque correction section that changes the reference torque from an original value and then returns the changed reference torque to the original value when the calculated speed of the electric vehicle is in a given speed range.

In accordance with a second aspect of the present invention, there is provided a control system for an electric vehicle. The electric vehicle includes an accelerator pedal, a brake pedal, an electric motor that provides road wheels with a torque through axle shafts and an inverter that feeds the electric motor with an electric current. The control system comprises a brake operation detecting section that detects an operation condition of the brake pedal; an accelerator operation detecting section that detects an operation condition of the accelerator pedal; a vehicle speed calculation section that calculates a speed of the electric vehicle; and a control unit that controls the inverter to provide the road wheels with a predetermined reference torque in accordance with a manipulated value of the accelerator pedal, the control unit including a reference torque correction section that changes the reference torque in accordance with the detected operation condition of the brake pedal and accelerator pedal when the calculated speed of the electric vehicle is in a given speed range.

In accordance with a third aspect of the present invention, there is provided a control system for an electric vehicle. The electric vehicle includes an accelerator pedal, a brake pedal, an electric motor that provides road wheels with a torque through axle shafts and an inverter that feeds the electric motor with an electric current. The control system comprises a vehicle speed calculation section that calculates a speed of the electric vehicle; and a control unit that controls the inverter to provide the road wheels with a predetermined reference torque in accordance with a manipulated value of the accelerator pedal, the control unit including a reference torque correction section that changes a deceleration of the electric vehicle caused by the reference torque when the calculated vehicle speed is in a speed range that induces a resonant vibration of a power train extending from the electric motor to the road wheels.

BRIEF DESCRIPTION OF THE DRAWINGS

Other objects and advantages of the present invention will become apparent from the following description when taken in conjunction with the accompanying drawings, in which:

FIG. 5 is a map for looking up a corrected torque according to a vehicle speed at the time when braking is ON;

DETAILED DESCRIPTION OF THE INVENTION

In the following, a control system for an electric vehicle according to the present invention will be described in detail with reference to the accompanying drawings.

Figure 1:
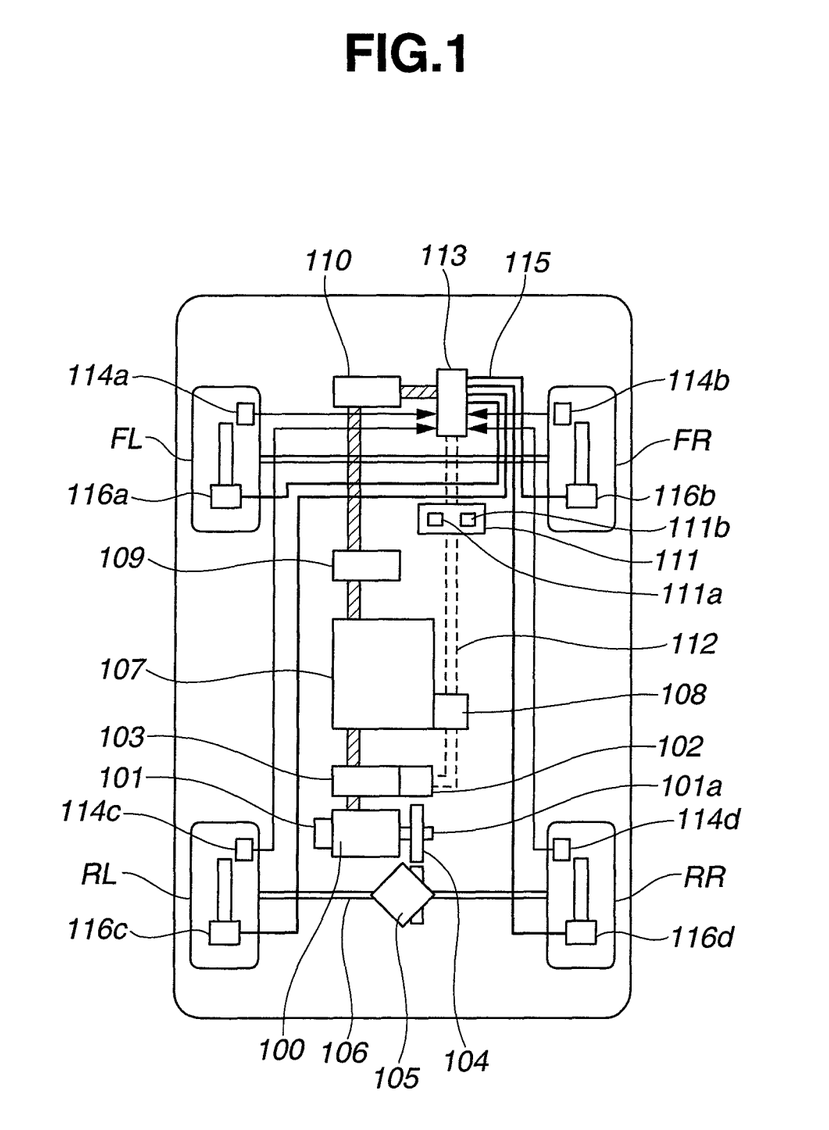
FIG. 1 is a system block diagram of an electric vehicle to which a control system of the present invention is practically applied.

Referring to FIG. 1, there is schematically shown an electric vehicle to which a control system of the present invention is practically applied.

[System Construction]

The electric vehicle is equipped with an electric motor 100 that produces a positive/negative torque. To motor 100, there is connected a resolver 101 that functions as a speed sensor (or vehicle speed calculating section) for motor 100. Denoted by numeral 102 is a motor controller that outputs a drive signal to an inverter 103 with reference to information from the speed sensor 101. Inverter 103 controls a motor torque by feeding motor 100 with an electric current in accordance with the drive signal.

An output shaft 100a of electric motor 100 is connected through a speed reduction device 104 and a differential gear 105 to axle shafts 106. Thus, the torque produced by electric motor 100 is transmitted to axle shafts 106 through speed reduction device 104 and differential gear 105. An electric energy for driving electric motor 100 is supplied by a high voltage battery 107. A battery controller 108 is provided for monitoring an operation condition (viz., stage of charge, heat generation and the like) of high voltage battery 107. To high voltage battery 107, there is connected a DC-DC converter 109, so that a low voltage battery 110 can be charged with an electricity of which voltage is dropped by DC-DC converter 109.

A vehicle controller (or control unit) 111 monitors strokes (or control amounts) of a brake pedal (not shown) and an is accelerator pedal (not shown) with the aid of a brake stroke sensor (or brake operation detecting section) 111a and an accelerator stroke sensor (or accelerator operation detecting section) 111b, and transmits, through an interior communication line 112, a positive/negative torque instruction to a brake control device 113 in accordance with the monitored strokes of the brake pedal and accelerator pedal. Brake control device 113 carries out a torque control, such as a drive slip suppression control (viz., TCS system) and a brake slip suppression control (viz., ABS control), by processing a road wheel speed information provided by wheel speed sensors 114a, 114b, 114c and 114d provided on front left, front right, rear left and rear right road wheels FL, FR, RL and RR respectively and a motor torque information provided by motor controller 102. It is to be noted that the drive slip suppression control and the brake slip suppression control are commonly called like "traction control and antilock braking control", respectively.

In case of controlling a friction braking torque by brake control device 113, a pump provided by brake control device 113 is operated in accordance with a pressing force applied to the brake pedal, so that a brake liquid is fed through hydraulic lines 115 to respective brake calipers 116a, 116b, 116c and 116d of front left, front right, rear left and rear right road wheels FL, FR, RL and RR thereby to produce a vehicle braking torque. While in case of controlling a motor torque by brake control device 113, a torque instruction is fed to motor controller 102 through the interior communication line 112.

As will become apparent as the description proceeds, in the electric vehicle to which the invention is practically applied, when the vehicle running is in a low speed-low torque range requiring only a small torque from motor 100, undesired vibration of the vehicle caused by a resonance phenomenon inevitably produced in a power train from motor 100 to the rear road wheels RL and RR is suitably restrained by shortening a time (or staying time) for which a resonance induction speed range, which causes generation of the resonance phenomenon, is kept or by preventing the vehicle from entering into the resonance induction speed range. For this purpose, the motor torque instruction to motor 100 is calculated in the following manner.

Although the resonance induction speed range varies in accordance with types of the vehicle, the following explanation will be made with respect to a resonance induction speed range of 2 to 3 km/h for ease of description.

[Calculation of Motor Torque Instruction]

Figure 2:
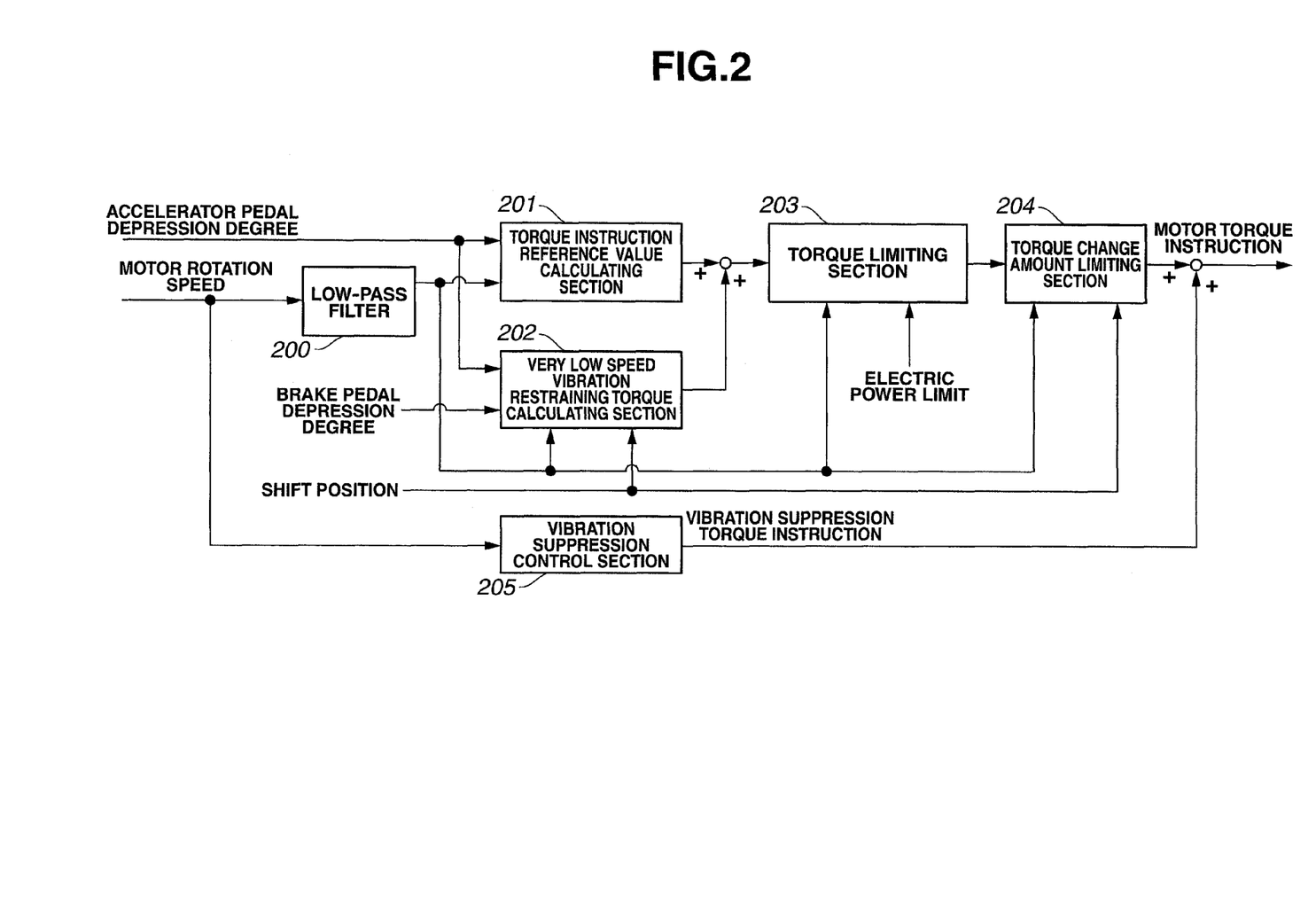
FIG. 2 is a block diagram of a controller that produces a motor torque instruction fed to an electric motor by processing various factors fed thereto.

FIG. 2 is a block diagram of a controller that calculates a motor torque instruction.

A low-pass filter 200 eliminates, from the motor rotation speed, a band of frequencies higher than a responsive frequency of the vehicle speed.

Figure 3:
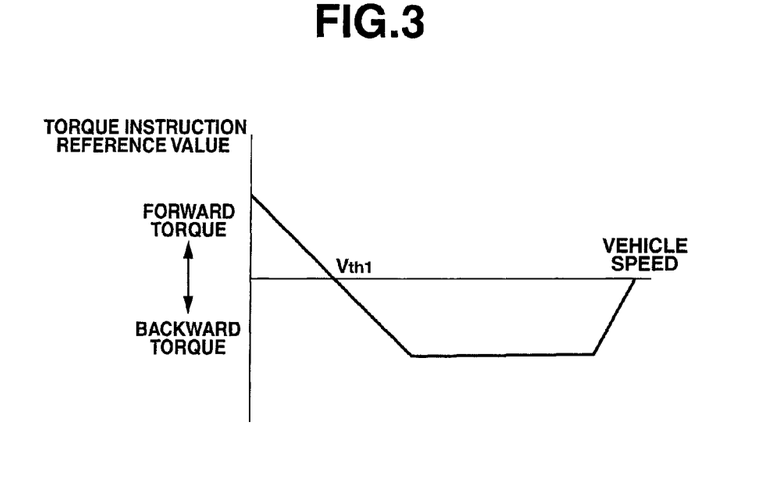
FIG. 3 is a map for looking up a torque instruction reference value.

A torque instruction reference value calculating section 201 calculates a torque instruction reference value (viz., reference torque) based on both the accelerator pedal depression degree and the frequency component of the motor rotation speed that has passed through low-pass filter 200. FIG. 3 is a map for calculating the torque instruction reference value at the time when the accelerator pedal depression degree is zero (0). As is seen from the map of FIG. 3, when the vehicle speed is lower than a first given speed Vth1 (for example, 5 km/h) due to standstill of the vehicle, a forward torque (viz., positive torque) is increased as the vehicle speed lowers in order to imitate the creep torque of the electric vehicle equipped with the automatic transmission, and when the vehicle speed is higher than the first given speed Vth1, a backward torque (viz., negative torque) is applied to the vehicle in order to imitate an engine brake torque. In case wherein the accelerator pedal depression degree is not zero (0), the torque instruction reference value is provided by looking up a torque map that is provided for each depression degree. The torque maps provided when the accelerator pedal is depressed have such a characteristic that the forward torque is increased as the depression degree increases. In a reverse mode of the vehicle, the maps have such a characteristic that the backward torque is increased as the depression degree increases.

Referring back to FIG. 2, a very low speed vibration restraining torque calculating section (viz., reference torque correcting section) 202 calculates a corrected torque based on the accelerator pedal depression degree, a brake pedal depression degree, the frequency component of the motor rotation speed that has passed through low-pass filter 200 and a shift position. The method for calculating the corrected torque will be described hereinafter. It is to be noted that the electric vehicle of the invention has four shift positions that are drive (D) position, reverse (R) position, neutral (N) position and parking (P) position.

A torque limiting section 203 limits the torque instruction reference value (viz., torque instruction) corrected based on the corrected torque, so that the motor output does not exceed an electric power limit value calculated by the battery controller 108.

A torque change amount limiting section 204 limits a rapid change of the torque instruction in order to protect gears of the power train from a rapid change of the motor torque and provide the driver with no uncomfortable feeling caused by such torque change.

A vibration suppression control section 205 calculates a vibration suppression torque instruction value based on the motor rotation speed for restraining a vibration such as torque ripple or the like that is produced under rotation of motor 100. The vibration suppression torque instruction value is added to the torque instruction that has been subjected to the torque change amount limiting process to produce a final motor torque is instruction. The motor torque instruction is transmitted to motor controller 102 through interior communication line 112.

[Calculation of Corrected Torque]

Figure 4:
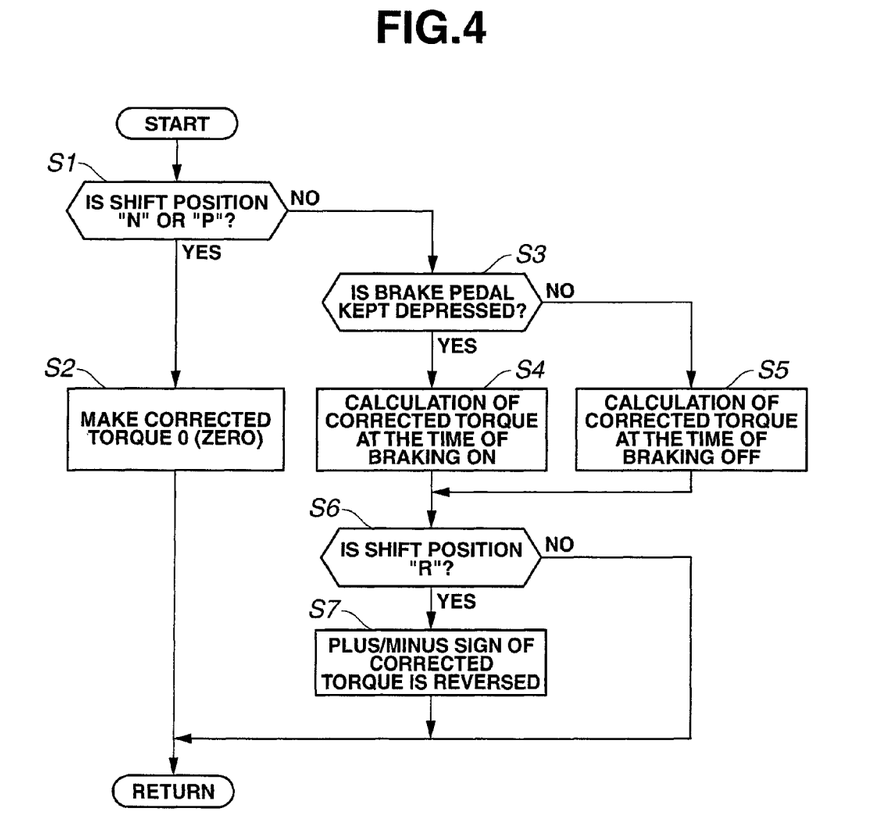
FIG. 4 is a flowchart that depicts a flow of programmed operation steps executed in a very low speed vibration restraining torque calculation section 202 in the controller of FIG. 2.

FIG. 4 is a flowchart depicting programmed operation steps executed by a very low speed vibration restraining torque calculation section 202. These steps are repeatedly carried out at predetermined intervals from an ignition-ON time to an ignition-OFF time.

At step S1, judgment is carried out as to whether the shift position is neutral (N) position or parking (P) position, or not. If YES, that is, when the shift position is neutral (N) position or parking (P) position, the operation flow goes to step S2. While, if NO, that is, when the shift position is not neutral (N) position nor parking (P) position, the operation flow goes to step S3.

At step S2, the corrected torque is made zero (0), and the operation flow goes to Return.

At step S3, judgment is carried out as to whether a brake pedal is kept depressed or not (viz., brake-ON or brake-OFF) by processing a brake pedal depression degree detected by brake stroke sensor 111a. If YES, that is, when the brake pedal is kept depressed, the operation flow goes to step S4, and if NO, that is, when the brake pedal is not kept depressed, the operation flow goes to step S5.

Figure 5:
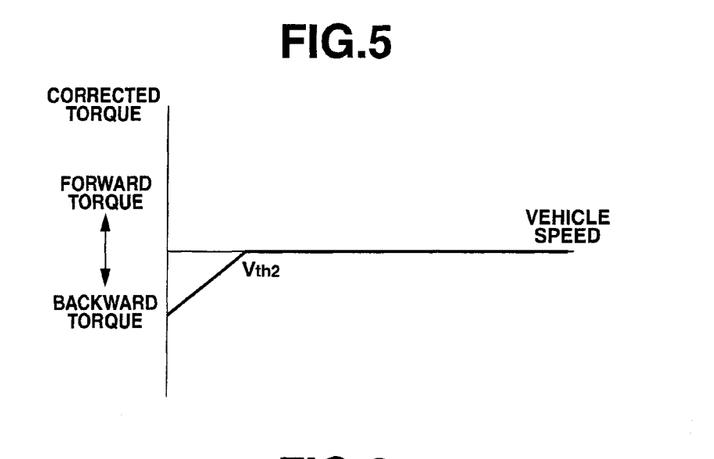

At step S4, a corrected torque at the time of braking ON is calculated with reference to the map of FIG. 5. The map of FIG. 5 plots the value of the corrected torque at the time of brake-ON in accordance with a vehicle speed. As is seen from the map, when the vehicle speed is lower than a second given speed Vth2 (for example, 4 km/h), the absolute value of the corrected torque for a reverse drive mode increases as the vehicle speed lowers. The second given vehicle speed Vth2 is set to a speed that is higher than an upper limit (for example, 3 km/h) of a resonance induction speed range where the vehicle exhibits a sympathetic is vibration.

Figure 6:
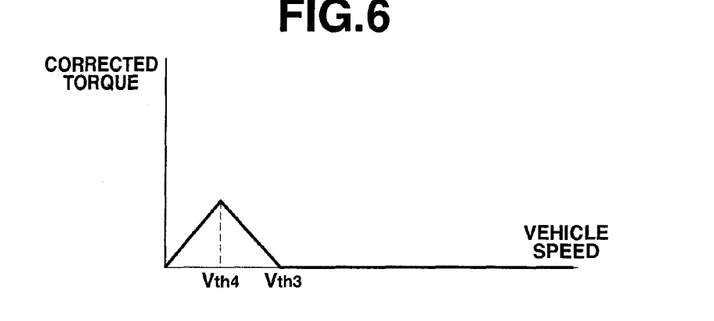
FIG. 6 is a map for looking up a corrected torque according to the vehicle speed at the time when braking is OFF.

Referring back to the flowchart of FIG. 4, at step S5, a corrected torque at the time of brake-OFF is calculated with reference to the map of FIG. 6. The map of FIG. 6 plots the value of the corrected torque at the time of brake-OFF in accordance with the vehicle speed. As is seen from the map, when the vehicle speed is lower than a third given speed Vth3 (for example, 7 km/h), the absolute value of the corrected torque for a forward drive mode increases as the vehicle speed increases from 0 (zero) to a fourth given speed Vth4 (for example, 4 km/h) and the absolute value of the corrected torque for the forward side increases as the vehicle speed lowers from the third given speed Vth3 (for example, 7 km/h) to the fourth given speed Vth4 (for example, 4 km/h). The fourth given speed Vth4 is set to a speed that is higher than the upper limit (for example, 3 km/h) of the resonance induction speed range where the vehicle exhibits the sympathetic vibration.

Referring back to the flowchart of FIG. 4, at step S6, judgment is carried out as to whether the shift position is reverse (R) position or not. If YES, that is, when the shift position is reverse (R) position, the operation flow goes to step S7, and if NO, that is, when the shift position is not neutral (N) position, the operation floes goes to Return.

At step S7, the plus/minus sign of the corrected toque calculated at step S6 is reversed between the forward drive mode and the reverse drive mode. Then, the operation flow goes to Return. That is, when the shift position is reverse (R) position, it becomes necessary to reverse the plus/minus sign of the to corrected torque since the direction of travel intended by the drive is reversed between the forward drive mode and the reverse drive mode.

In the following, operation will be described.

[Very Low Speed Vibration Restraining Operation]

In the above-mentioned Japanese Patent No. 3995835, for the purpose of restraining undesired vibration of a power train, the difference between an actual motor torque actually detected and an estimated torque provided by simulation is calculated to provide an estimated disturbance torque and a control torque provided by multiplying the estimated disturbance torque and a gain is fed back to a torque instruction to an electric motor. In this known technology, for obtaining a satisfied vibration restraining operation, it is necessary to precisely control the motor torque in accordance with the torque instruction corrected by the feedback, which needs a high torque control performance.

As is known, the torque control performance depends on a controllability of an inverter that drives the electric motor. However, when, due to the very low speed condition, the electric vehicle is in a low speed low torque range wherein the driving torque of the electric motor is small, the torque control performance is low and thus satisfied vibration restraining effect is not obtained. This is because of the followings. The control torque for restraining the vibration is very small (for example, several amperes) as compared with the driving torque (for example, several hundreds of amperes) of the electric motor, and thus, when the controllability of the inverter is lowered, it becomes difficult to control the small torque.

Accordingly, when, in the above-mentioned known technology, the vehicle is in the low speed low torque range, the vibration of the electric vehicle caused by the resonance phenomenon of the power train from the electric motor to the road wheels is not sufficiently restrained.

While, in case of the present invention, when, with the brake pedal kept depressed by the driver, the electric vehicle runs at a speed within a given range from 0 (zero) to the second given speed Vth2 (for example, 4 km/h), a motor torque instruction produced by reducing a torque instruction reference is value by a corrected torque is derived for driving the electric motor 100. Under this condition, the corrected torque for the reverse drive mode increases as the vehicle speed lowers, and thus, the decreasing gradient of the vehicle speed, that is, the deceleration of the electric vehicle shows a large value as compared with a value prepared in a case wherein the torque instruction reference value is directly used as the motor torque instruction.

That is, when the driver intends to stop the electric motor, he or she can reduce a time (or staying time) for which the vehicle speed stays in the resonance induction speed range (2 to 3 km/h) of the power train before stopping of the vehicle, by stopping the vehicle with the aid of a deceleration that is greater than a deceleration obtained by a manipulated value of a brake pedal. By the reduction of the staying time, the vibration level of the vehicle can be reduced. Although, in this case, the vehicle deceleration becomes higher than a deceleration expected by the driver, the driver is suppressed from having uncomfortable feeling because he or she intends to stop the vehicle.

In case of the present invention, when, with both the brake and accelerator pedals kept released, the electric vehicle runs at a speed within the given range from 0 (zero) to the third given speed Vth3 (for example, 7 km/h), a motor torque instruction produced by increasing the torque instruction reference value by the corrected torque is derived for driving the electric motor 100. Under this condition, until the time when the vehicle speed reaches the fourth given speed Vth4 (for example, 4 km/h), the corrected torque for the forward drive mode increases as the vehicle speed increases, and thus, the increasing gradient of the vehicle speed, that is, the acceleration of the electric vehicle shows a large value as compared with a value prepared in a case wherein the torque instruction reference value is directly used as the motor torque instruction.

That is, in case wherein the driver starts the electric vehicle with the aid of a creep torque, he or she can reduce the time (or staying time) for which the vehicle speed stays in the resonance induction speed range (2 to 3 km/h) of the power train, by accelerating the vehicle by using a torque that is greater than the creep torque. By the reduction of the staying time, the vibration level of the vehicle can be reduced. Although, in this case, the vehicle acceleration becomes higher than an acceleration expected by the driver in view of the creep torque, the drive is suppressed from having uncomfortable feeling because he or she intends to start the vehicle.

In this vehicle starting, the corrected torque shows a peak value when the vehicle speed comes to the fourth given speed Vth4 (for example, 4 km/h), and thereafter, the corrected torque gradually reduces as the vehicle speed increases, and the corrected torque shows 0 (zero) when the vehicle speed shows the third given speed Vth3 (for example, 7 km/h), so that the motor torque instruction is converged to the torque instruction reference value. With this, a rapid torque change at the time when the corrected torque becomes 0 (zero) is suppressed.

As is described hereinabove, in the present invention, the time (or staying time) for which the vehicle speed stays in the resonance induction speed range (2 to 3 km/h) of the power train is reduced for reducing the vibration level of the vehicle. Accordingly, even in a low speed low torque condition of the electric vehicle that lowers the controllability of the inverter 103, satisfied vibration restraining effect is obtained irrespective of the to torque control performance. Furthermore, since the corrected torque used for correcting the torque instruction reference value is easily derived with reference to a map that depicts a relation between the electric motor speed and the vehicle speed, simplification of the system is achieved as compared with the above-mentioned known system in which a disturbance torque is estimated by using an inversed model of the power train and the estimated disturbance torque is fed back to the torque instruction to an electric motor. Thus, the control system of the present invention is able to bring about reduction in cost.

In the following, with the aid of FIG. 7, the very low speed vibration restraining effect possessed by the control system of the present invention will be described with respect to a running condition of an associated electric vehicle.

Figure 7:
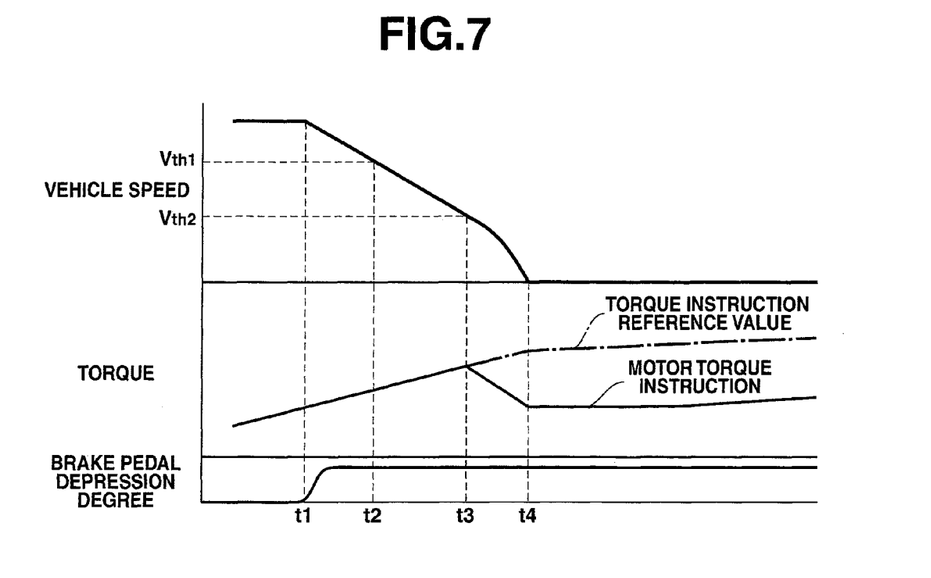
FIG. 7 is a time chart that depicts a very low speed vibration restraining effect at the time when a brake pedal is kept depressed.

FIG. 7 is a time chart that depicts the very low speed vibration restraining effect at the time when a brake pedal is kept depressed.

As shown in FIG. 7, before time t1 for which the brake pedal is not depressed, the electric vehicle keeps a speed that is higher than both the first given speed Vth1 (for example, 5 km/h) and the second given speed Vth2 (for example, 4 km/h).

At time t1, the brake pedal is depressed, and thus, the electric vehicle starts deceleration. In the control system (see the flowchart of FIG. 4), a flow of operation steps including "S1→S3→S4→S6" is carried out or repeated. Since the vehicle shows a speed higher than the second given speed Vth2 at the time of the depression of the brake pedal, the step S4 calculates, with the aid of the map of FIG. 5, that the corrected torque is 0 (zero).

From time t1 to time t2, the vehicle speed gradually lowers.

At time t2, the vehicle speed shows the first given speed Vth1 (for example, 5 km/h). Upon this, switching is carried out from a reverse mode torque wherein the torque instruction reference value imitates the engine brake to a forward mode torque wherein the torque instruction reference value imitates the creep torque.

At time t3, the vehicle speed shows the second given speed Vth2 (for example, 4 km/h). Upon this, the corrected torque for is the reverse mode gradually increases as the vehicle speed lowers. Thus, as the vehicle speed lowers, the motor torque instruction takes a much smaller value relative to the torque instruction reference value.

At time t4, the electric vehicle stops.

As is described hereinabove, in case of stopping the vehicle by depressing the brake pedal, there is set a motor torque instruction that is made smaller (or larger in a reverse mode) than the torque instruction reference value due to the work of a corrected torque, and thus, the vehicle can pass through the resonance induction speed range quickly or speedily before stopping. That is, since the time for which a resonance phenomenon (or resonant vibration) of the vehicle takes place is shortened, the vibration level of the vehicle can be reduced.

Figure 8:
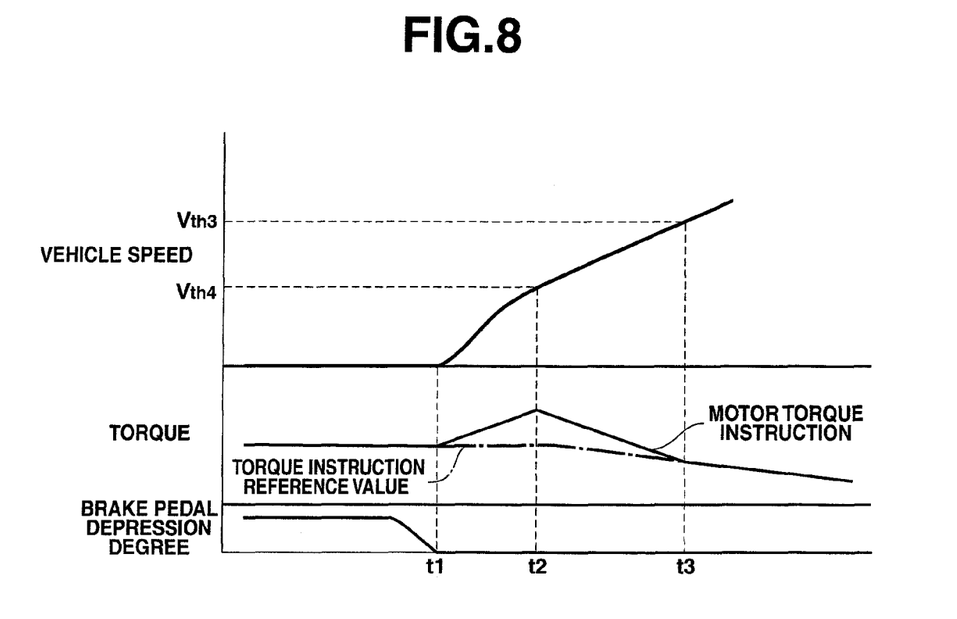
FIG. 8 is a time chart that depicts the very low speed vibration restraining effect at the time when, under stopping of the electric vehicle, the brake pedal is released inducing starting of the electric vehicle by a dummy creep torque.

FIG. 8 is a time chart that depicts the very low speed vibration restraining effect at the time when, with the electric vehicle stopped, the brake pedal is released thereby inducing starting of the vehicle by a dummy creep torque.

Until time t1, the brake pedal is kept depressed and thus the vehicle speed is 0 (zero).

At time t1, the brake pedal is released thereby making the brake pedal depression degree 0 (zero). Upon this, the electric vehicle starts to move with the torque instruction reference value that imitates the creep torque. In the control system (see the flowchart of FIG. 4), a flow of operation steps including "S1→S3→S5→S6" is carried out or repeated. Under this condition, the vehicle speed is lower than the fourth given speed Vrh4 (for to example, 4 km/h), and thus, the step S6 (see the flowchart of FIG. 4) calculates, with the aid of the map of FIG. 6, that the corrected torque gradually increases as the vehicle speed increases. Accordingly, as the vehicle speed increases, the motor torque instruction takes a much larger value relative to the torque is instruction reference value.

At time t2, the vehicle speed shows the fourth given speed Vth4 (for example, 4 km/h). Upon this, the corrected torque gradually reduces as the vehicle speed increases, and the motor torque instruction gradually approaches the torque instruction reference value as the vehicle speed increases.

At time t3, the vehicle speed shows the third given speed Vth3 (for example, 7 km/h). Upon this, the corrected torque becomes 0 (zero), and the motor torque instruction becomes coincident with the torque instruction reference value.

As is described hereinabove, in case of starting the electric vehicle with the aid of the creep torque, there is set a motor torque instruction that is made larger than the torque instruction reference value due to the work of a corrected torque, and thus, the vehicle can pass through the resonance induction speed range quickly and speedily before much increasing the speed. That is, since the time for which a resonance phenomenon (or resonant vibration) of the vehicle takes place is shortened, the vibration level of the vehicle can be reduced.

Figure 9:
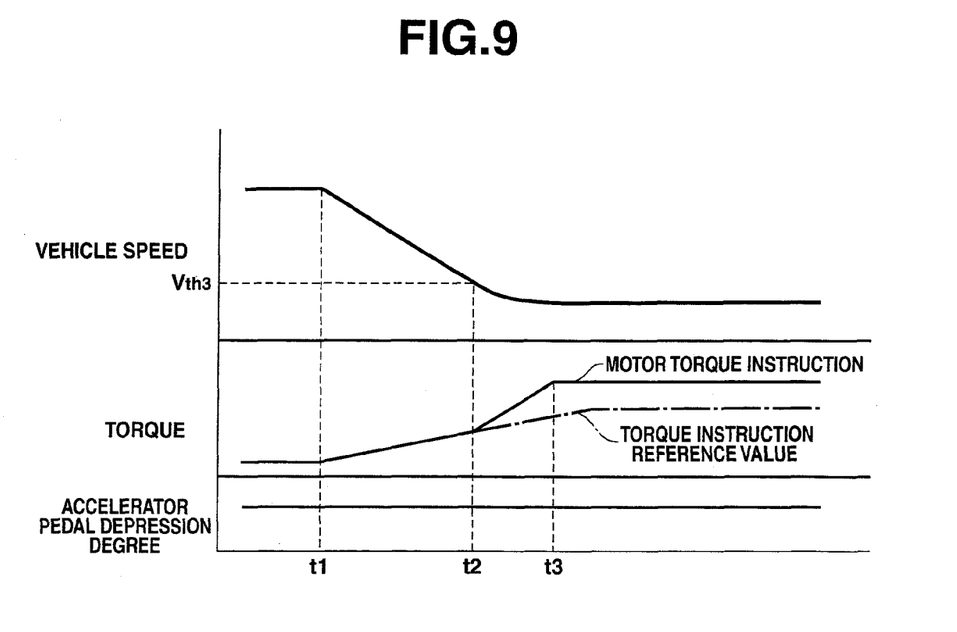
FIG. 9 is a time chart that depicts the very low speed vibration restraining effect at the time when, with an accelerator pedal kept depressed by a given degree, the electric vehicle enters a gentle upslope.

FIG. 9 is a time chart that depicts the very low speed vibration restraining effect at the time when, with the accelerator pedal kept depressed by a given degree, the electric vehicle enters a gentle upslope.

At time t1, the electric vehicle just enters the gentle upslope, and thus, thereafter, the vehicle speed gradually lowers. In the control system (see the flowchart of FIG. 4), a flow of operation steps including "S1→S3→S5→S6" is carried out or repeated. Since, at this time, the vehicle speed is higher than the third given speed Vth3 (for example, 7 km/h), the step S5 calculates, with the aid of the map of FIG. 6, that the corrected torque is 0 (zero).

At time t2, the vehicle speed shows the third given speed Vth3 (for example, 7 km/h). Upon this, the corrected torque is gradually increase as the vehicle speed lowers. Thus, as the vehicle speed lowers, the motor torque instruction takes a much larger value relative to the torque instruction reference value.

At time t3, the vehicle speed becomes constant.

As is described hereinabove, in case of running the electric vehicle having the accelerator pedal kept depressed by a certain degree, there is set a motor torque instruction that is larger than the torque instruction reference value due to the work of a corrected torque. If, in this case, a vehicle drive force provided by the motor torque instruction is larger than a drive load caused by the gentle upslope, the drive force and the drive load can become balanced at a vehicle speed that is higher than the resonance induction speed range (for example, 2 to 3 km/h), and thus, lowering of the vehicle speed to the resonance induction speed range can be avoided.

Figure 10:
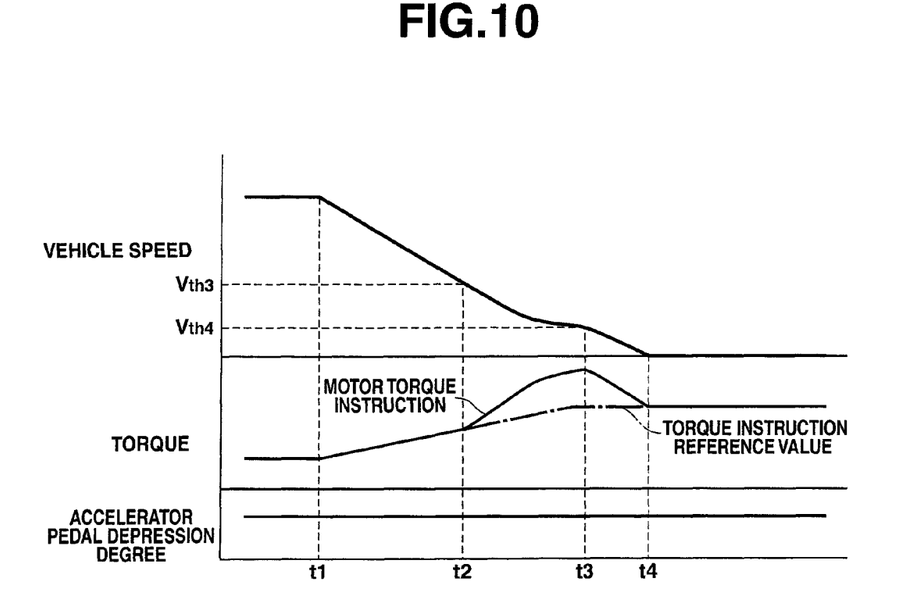
FIG. 10 is a time chart that depicts the very low speed vibration restraining effect at the time when, with the accelerator pedal kept depressed by a given degree, the electric vehicle is enters a steep upslope.

FIG. 10 is a time chart that depicts the very low speed vibration restraining effect at the time when, with the accelerator pedal kept depressed by a given degree, the electric vehicle enters a steep upslope.

At time t1, the electric vehicle just enters the steep upslope, and thus, thereafter, the vehicle speed gradually lowers. In the control system (see the flowchart of FIG. 4), a flow of operation steps including "S1→S3→S5→S6" is carried out or repeated. Since, at this time, the vehicle speed is higher than the third given speed Vth3 (for example, 7 km/h), the step S5 calculates, with the aid of the map of FIG. 6, that the corrected torque is 0 (zero).

At time t2, the vehicle speed shows the third given speed Vth3 (for example, 7 km/h). Upon this, the corrected torque gradually increases as the vehicle speed lowers. Thus, as the vehicle speed lowers, the motor torque instruction takes a much larger value relative to the torque instruction reference value.

At time t3, the vehicle speed shows the fourth given speed is Vth4 (for example, 4 km/h). Upon this, the corrected torque gradually reduces as the vehicle speed lowers. Accordingly, the motor torque instruction gradually approaches the torque instruction reference value as the vehicle speed lowers.

At time t4, the vehicle stops.

As is described hereinabove, in the case wherein a vehicle drive force provided by the motor torque instruction is smaller than a drive load caused by the steep upslope, the vehicle can pass through the resonance induction speed range quickly and speedily before stopping. That is, since the time for which the resonance phenomenon (or resonant vibration) of the vehicle takes place is shortened, the vibration level of the vehicle can be reduced.

In the following, various advantages obtained and expected from the control system of the present invention will be described.

(1) In the present invention, there is provided a control system for an electric vehicle. The electric vehicle includes an electric motor (100) that provides road wheels (RL, RR) with a torque through axle shafts (106), an inverter (103) that feeds the electric motor (100) with an electric current, and a control unit (111) that controls the inverter (103) in such a manner as to provide the road wheels (RL, RR) with a predetermined reference torque in accordance with a manipulated value of an accelerator pedal (viz., the degree by which the accelerator pedal is depressed). The control system comprises a vehicle speed calculation section (101) that calculates a speed of the electric vehicle and a very low speed vibration restraining torque calculation section (202) provided in the control unit, that increases or reduces the reference torque and then returns the increased or reduced reference torque to its original value when the calculated vehicle speed is in a given speed range (viz., resonant vibration induction speed range).

With this feature, the time for which the vehicle speed stays in the given speed range (viz., resonant vibration induction speed range) can be shortened, and thus, undesired vehicle vibration produced when the vehicle is in the resonant vibration induction speed range can be reduced, which increases the vehicle vibration restraining effect.

(2) According to the present invention, there are employed both a brake stroke sensor (111a) that detects operation condition of the brake pedal and an accelerator stroke sensor (111b) that detects operation condition of the accelerator pedal. The very low speed vibration restraining torque calculation section (202) increases the torque instruction reference value when the two stroke sensors (111a, 111b) don't detect operation condition of the brake and accelerator pedals, and decreases the torque instruction reference value when the brake stroke sensor (111a) detects operation condition of the brake pedal.

With this feature, in case wherein both the brake pedal and accelerator pedal are kept released, the vehicle speed is speedily increased to shorten the time for which the vehicle speed stays in the given speed range (viz., resonant vibration induction speed range). While, in case wherein the brake pedal is depressed, the vehicle is speedily stopped to shorten the time for which the vehicle speed stays in the given speed range (viz., resonant vibration induction speed range).

(3) In the invention, the given speed range (viz., resonant vibration induction speed range) is set to a speed range wherein a power train extending from the electric motor (100) to the road wheels (RL, RR) tends to produce a resonant vibration thereof.

Thus, the vibration level of the vehicle caused by the resonant vibration of the power train in a low speed low torque range can be avoided or at least minimized.

Modifications

In the above-mentioned embodiment, the corrected torque is calculated in accordance with the vehicle speed. However, if desired, a system may be used wherein when the vehicle speed is in the resonant vibration induction speed range, the corrected torque is changed with passage of time. With this system, the stay of the vehicle speed in the resonant vibration induction speed range is much effectively restrained.

In the above-mentioned embodiment, the brake stroke sensor and the accelerator stroke sensor are employed for detecting the brake operation condition and accelerator operation condition. However, if desired, other sensors, such as those that detect a brake pedal pressing force, a hydraulic pressure of the brake, an accelerator pedal pressing force and the like. In this case, the step S3 of the flowchart of FIG. 4 is arranged to judge a magnitude of the force applied to the brake pedal, and if the force is large, it is judged that the brake is ON and if the force is small, it is judged that the brake is OFF.

The range of the vehicle speed in which the torque instruction reference is corrected by the corrected torque may be a range in which at least the resonant vibration range of the power train is contained.

The present invention is applicable to a hybrid motor vehicle. Also in this case, substantially same advantages as those mentioned hereinabove are obtained and expected.

In the above, the description is directed to the case wherein the given speed range is set to the range where a resonant vibration of the power train takes place. However, if desired, the given speed range may be set to a range where the resonant vibration of the power train or vehicle takes place due to other reasons.

The entire contents of Japanese Patent Application 2011-062378 filed Mar. 22, 2011 are incorporated herein by reference.

Although the invention has been described above with reference to an embodiment of the invention, the invention is not limited to such embodiment as described above. Various is modifications and variations of such embodiments may be carried out by those skilled in the art, in light of the above description.

What is claimed is:

1. A control system for an electric vehicle, the electric vehicle including an accelerator pedal, a brake pedal, an electric motor that provides road wheels of the electric vehicle with a torque through axle shafts, and an inverter that feeds the electric motor with an electric current, the control system comprising:
a vehicle speed calculation section that calculates a traveling speed of the electric vehicle;
a control unit that controls the inverter to provide the road wheels with a predetermined reference torque through the electric motor in accordance with a manipulated value of the accelerator pedal, the control unit including a reference torque correction section that, when the calculated traveling speed is in a given speed range, changes the predetermined reference torque from an original value and then returns the changed predetermined reference torque to the original value; and
a brake operation detecting section that detects an operation condition of the brake pedal and an accelerator operation detecting section that detects an operation condition of the accelerator pedal,
in which the reference torque correction section increases the reference torque when non-depression of both the brake and accelerator pedals is detected by the brake and accelerator operation detecting sections.

2. A control system for an electric vehicle, the electric vehicle including an accelerator pedal, a brake pedal, an electric motor that provides road wheels of the electric vehicle with a torque through axle shafts, and an inverter that feeds the electric motor with an electric current, the control system comprising:
a vehicle speed calculation section that calculates a traveling speed of the electric vehicle;
a control unit that controls the inverter to provide the road wheels with a predetermined reference torque through the electric motor in accordance with a manipulated value of the accelerator pedal, the control unit including a reference torque correction section that, when the calculated traveling speed is in a given speed range, changes the predetermined reference torque from an original value and then returns the changed predetermined reference torque to the original value; and
a brake operation detecting section that detects an operation condition of the brake pedal,
in which the reference torque correction section increases the reference torque when non-depression of the brake pedal is detected by the brake operation detecting section;
in which the reference torque correction section reduces the reference torque when depression of the brake pedal is detected by the brake operation detecting section; and
in which the reference torque correction section increases a decrement of the reference torque as the calculated traveling speed lowers.

3. A control system for an electric vehicle, the electric vehicle including an accelerator pedal, a brake pedal, an electric motor that provides road wheels of the electric vehicle with a torque through axle shafts, and an inverter that feeds the electric motor with an electric current, the control system comprising:
a vehicle speed calculation section that calculates a traveling speed of the electric vehicle;
a control unit that controls the inverter to provide the road wheels with a predetermined reference torque through the electric motor in accordance with a manipulated value of the accelerator pedal, the control unit including a reference torque correction section that, when the calculated traveling speed is in a given speed range, changes the predetermined reference torque from an original value and then returns the changed predetermined reference torque to the original value; and
a brake operation detecting section that detects an operation condition of the brake pedal,
in which the reference torque correction section increases the reference torque when non-depression of the brake pedal is detected by the brake operation detecting section; and
in which, in a speed range smaller than a second given speed that is smaller than a first given speed, the reference torque correction section increases an increment of the reference torque as the calculated traveling speed increases.

4. A control system for an electric vehicle, as claimed in claim 3, in which, in a speed range from the first given speed to the second given speed, the reference torque correction section increases the increment of the reference torque as the calculated traveling speed reduces.

5. A control system for an electric vehicle, claim 1, in which the given speed range corresponds to a speed range that induces a resonant vibration of a power train extending from the electric motor to the road wheels.

6. A control system for an electric vehicle, the electric vehicle including an accelerator pedal, a brake pedal, an electric motor that provides road wheels of the electric vehicle with a torque through axle shafts, and an inverter that feeds the electric motor with an electric current, the control system comprising:
a brake operation detecting section that detects an operation condition of the brake pedal;
an accelerator operation detecting section that detects an operation condition of the accelerator pedal;
a vehicle speed calculation section that calculates a traveling speed of the electric vehicle; and
a control unit that controls the inverter to provide the road wheels with a predetermined reference torque through the electric motor in accordance with a manipulated value of the accelerator pedal, the control unit including a reference torque correction section that, when the calculated traveling speed is in a given speed range, changes the predetermined reference torque in accordance with the detected operation condition of the brake pedal and accelerator pedal,
in which the given speed range corresponds to a speed range that induces a resonant vibration of a power train extending from the electric motor to the road wheels;
in which the reference torque correction section returns the reference torque to its original value after changing the reference torque;

in which the reference torque correction section increases the reference torque when non-depression of the brake pedal is detected by the brake operation detecting section;

in which the reference torque correction section increases the reference torque when depression of the accelerator pedal is detected by the accelerator operation detecting section; and in which the reference torque correction section increases the reference torque when non-depression of both the brake and accelerator pedals is detected by the brake and accelerator operation detecting sections.

7. A control system for an electric vehicle, the electric vehicle including an accelerator pedal, a brake pedal, an electric motor that provides road wheels of the electric vehicle with a torque through axle shafts and an inverter that feeds the electric motor with an electric current, the control system comprising:

a vehicle speed calculation section that calculates a traveling speed of the electric vehicle;

a brake operation detecting section that detects an operation condition of the brake pedal;

an accelerator operation detecting section that detects an operation condition of the accelerator pedal; and a control unit that controls the inverter to provide the road wheels with a predetermined reference torque through the electric motor in accordance with a manipulated value of the accelerator pedal, the control unit including a reference torque correction section that, when the calculated traveling speed is in a given speed range, changes a deceleration of the electric vehicle caused by the predetermined reference torque when the calculated traveling speed is in a speed range that induces a resonant vibration of a power train extending from the electric motor to the road wheels, in which the reference torque correction section increases the reference torque when non-depression of both the brake and accelerator pedals is detected by the brake and accelerator operation detecting sections; and in which the reference torque correction section returns the reference torque to its original value after changing the deceleration of the electric vehicle.

8. A control system for an electric vehicle, as claimed in claim 7, further comprising a brake operation detecting section that detects an operation condition of the brake pedal, and in which the reference torque correction section increases the reference torque when non-depression of the brake pedal is detected by the brake operation detecting section.

9. A control system for an electric vehicle, as claimed in claim 7, further comprising an accelerator operation detecting section that detects an operation condition of the accelerator pedal, and in which the reference torque correction section increases the reference torque when depression of the accelerator pedal is detected by the accelerator operation detecting section.

* * * * *